United States Patent [19]

Burek et al.

[11] Patent Number: 5,613,029

[45] Date of Patent: Mar. 18, 1997

[54] FIBER OPTIC SPLICE TRAY HINGE ADAPTER

[75] Inventors: Denis E. Burek, Cumming; George E. Mock, Duluth, both of Ga.

[73] Assignee: Lucent Technologies Inc., Murray Hill, N.J.

[21] Appl. No.: 438,312

[22] Filed: May 10, 1995

[51] Int. Cl.$^6$ ..................................................... G02B 6/36
[52] U.S. Cl. .......................... 385/135; 385/134; 211/194; 211/41
[58] Field of Search ................................... 385/134, 135; 211/41, 194; 269/126, 127, 128

[56]  References Cited

U.S. PATENT DOCUMENTS

| | | | |
|---|---|---|---|
| 4,911,521 | 3/1990 | Ryuto et al. | 385/135 |
| 5,080,459 | 1/1992 | Wettengel et al. | 385/135 |
| 5,085,397 | 2/1992 | Henkel | 211/194 |
| 5,323,478 | 6/1994 | Milanowski et al. | 385/135 |

*Primary Examiner*—Rodney B. Bovernick
*Assistant Examiner*—Yisun Song

[57] ABSTRACT

A hinge adapter mounts to a fiber optic splice tray, such as the Keptel LL-2400® splice tray, and provides a hinging capability to these splice trays. The hinge adapters have a U-shaped member mounted at each corner of the splice tray. The U-shaped member has a central portion having a pair of arms depending therefrom, with the distal ends of the arms having an aperture and the ends of the central portion having a protrusion. When stacking the splice trays, the apertures formed in the arms of one hinge adapter receive protrusions in the central portion of another hinge adapter. When the hinge adapters on one side of a desired splice tray are separated from the hinge adapters above that splice tray, an installer or lineman can pivot the upper splice trays away from the desired tray and readily gain access to the desired splice tray. The U-shaped members are mounted to a side of the splice tray by brackets which are inserted into an area of the splice trays. The U-shaped members, the brackets, and a flexible band which joins two brackets are molded out of a flexible material, such as polycarbonate.

18 Claims, 3 Drawing Sheets

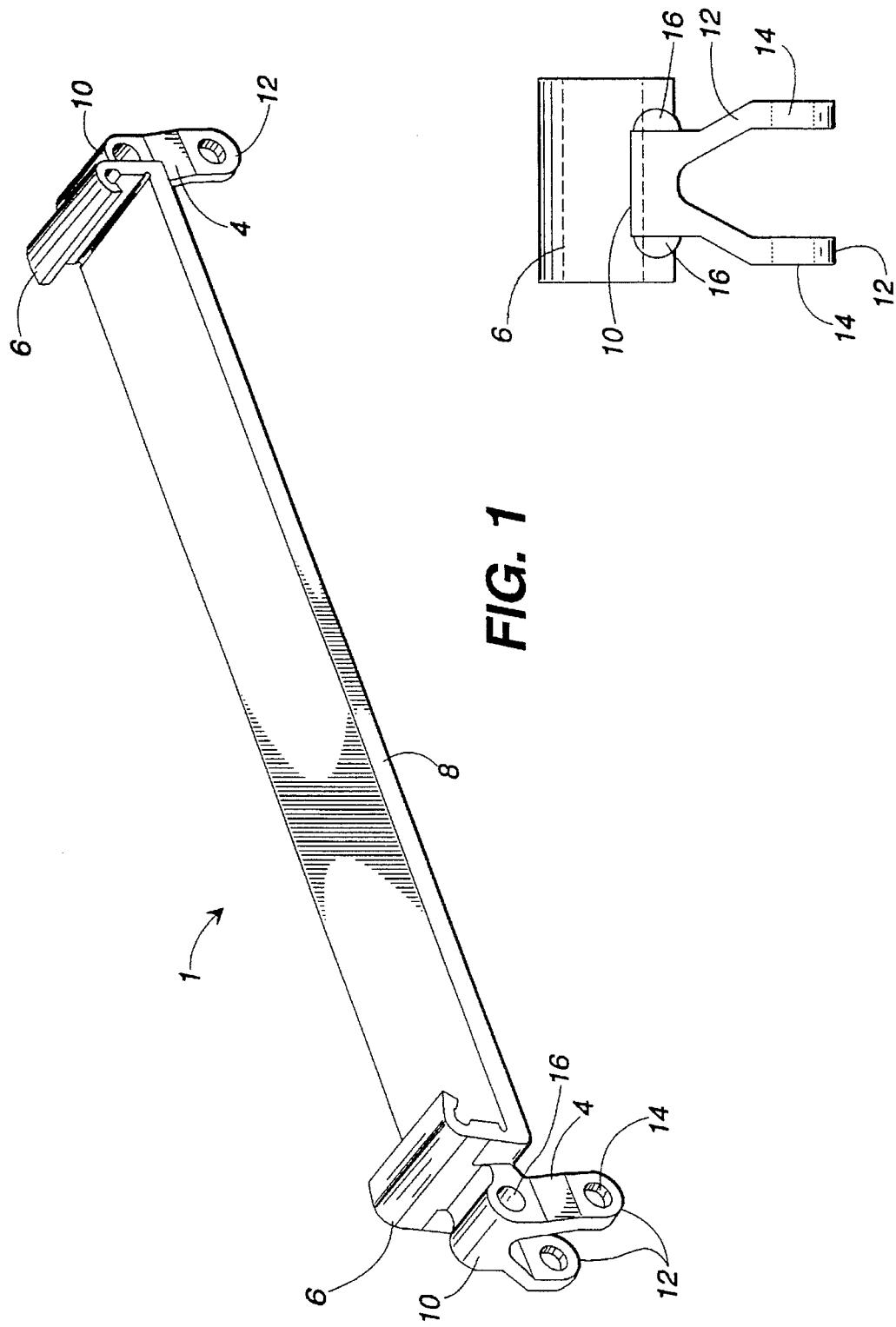

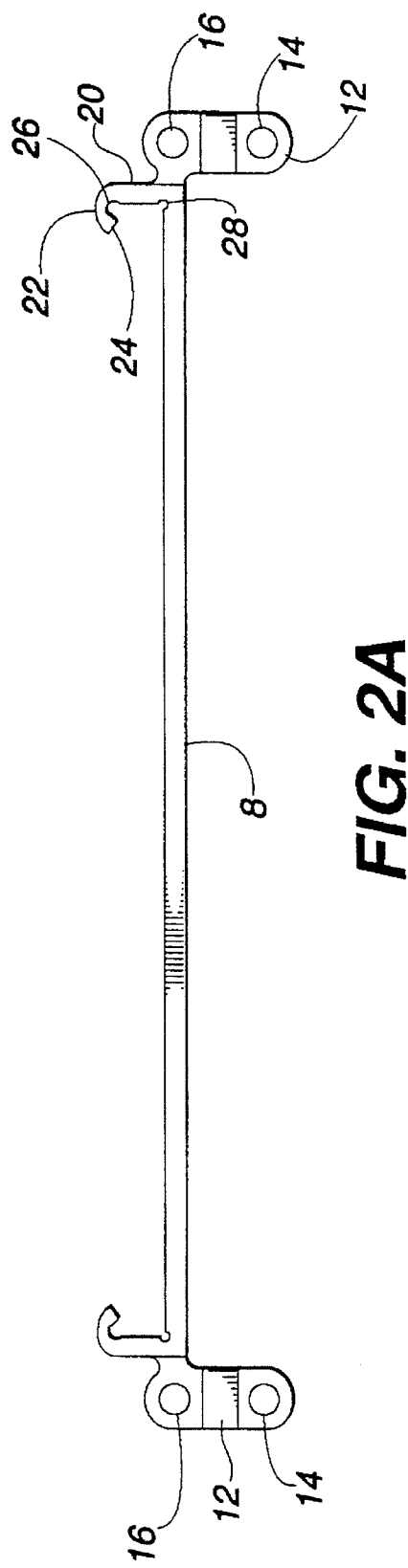
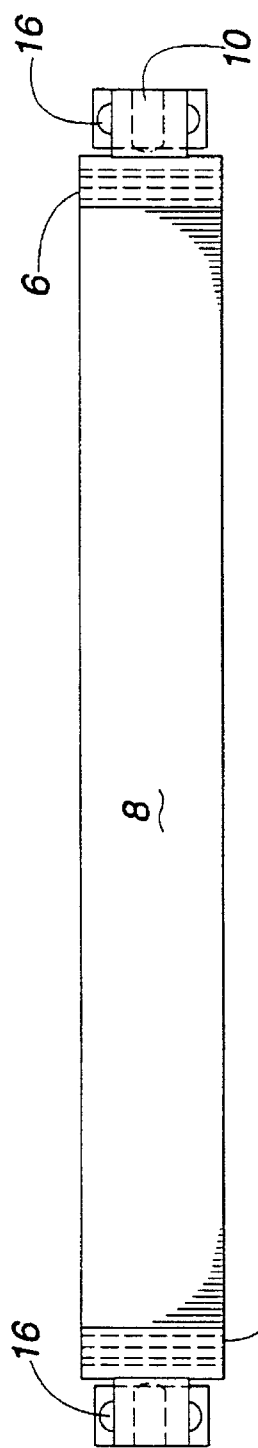
FIG. 2A
FIG. 2B

FIBER OPTIC SPLICE TRAY HINGE ADAPTER

FIELD OF THE INVENTION

This invention generally relates to a hinge adapter and, more particularly, to an adapter for providing a hinging capability to a fiber optic splice tray.

BACKGROUND OF THE INVENTION

The optical transmission characteristics of optical fibers can be seriously degraded when a fiber is bent or kinked in too small a radius. Also, since optical fibers are relatively fragile structures which can break if they are bent below a certain radius or if they are twisted too sharply, fiber optic cables are designed to have a number of protective layers and elements formed around the optical fibers to prevent any damage from occurring to the fibers and to control, at least to some extent, the degree of bending. In many fiber optic cables, these protective layers and elements include a core tube for encasing the optical fibers, an armor sheath formed of a metallic material which is wrapped around the core tube, and an outer jacket formed of a medium or high density polyethylene.

When an optical fiber is to be spliced to, for instance, another optical fiber, the outer protective layers of the cables must be removed to expose the ends of the optical fibers. The ends of the fibers are then inserted within a splice which holds the ends of the fibers in alignment with, and abutting, each other. As is typical in the industry, an optical fiber splice closure receives the fiber optic cables, protects the exposed optical fibers, and holds the optical splices. The optical fiber is separated from the core tube within a splice tray in the closure and an insert within the splice tray holds the actual splice. Because each splice tray can only hold a limited number of splices, each optical closure typically contains a number of splice trays which are usually stacked on top of each other in order to hold all of the necessary splices.

An installer or lineman often needs to reenter individual splice trays in the stack to perform additional work, such as to perform additional splices or repair existing splices. The installer or lineman, however, may encounter some difficulty in accessing a splice tray other than the top tray since all of the splice trays above the desired splice tray must be moved to another location or otherwise out of the way, which may be difficult given the often limited amount of space in the closures and the constraints imposed by short fiber lengths.

This difficulty has, to some extent, been overcome with some splice trays which are currently being manufactured with leaf members having holes therein at the two bottom rear corners of the trays and hinge pins at the two top rear corners of the trays. When these splice trays are stacked on top of each other, the hinge pins on a lower splice tray protrude into the holes formed in the leaf members of an upper splice tray. With such an arrangement, the installer or lineman can more readily access a desired splice tray by simply pivoting the upper splice trays away from the desired splice tray. See, for example, the splice trays shown in U.S. Pat. No. 5,519,804 of Burek et al., filed Jun. 22, 1994. Unfortunately, most of the earlier manufactured splice trays and some of the presently manufactured trays, such as the Keptel LL-2400® splice tray, do not have these hinge pins and leafs. A need therefore exists for a device for providing a hinging capability to these pre-existing splice trays so that lineman or installers can more readily access all of the splice trays in an optical closure.

SUMMARY OF THE INVENTION

The present invention, in a preferred embodiment thereof, is an adapter for providing a hinging capability to an optical fiber splice tray. The adapter comprises a U-shaped member having a central portion and a pair of resilient arms depending from either side thereof. The distal ends of the arms are spaced apart from each other a distance approximately equal to a width of the central portion. The central portion has, on either end thereof, a spherical detent and the distal end of each arm has a recessed portion adapted to receive a spherical detent. When the U-shaped member is attached to a side of splice tray to be stacked, the recessed portions in the arms receive the detents on the central portion of a second adapter on a second splice tray and, together with the central portion of the second adapter, define an axis about which the fiber optic splice trays can pivot relative to each other. A U-shaped member is attached to, or is integral with, each end of a mounting bracket for attaching a U-shaped member to each side of a splice tray.

The bracket for attaching the U-shaped member to the splice tray comprises an elongated web or band, having a length approximately equal to the width of the splice tray, and having, at each end, a C-shaped portion adapted to be a snug fit on the splice tray. The adapter, in one example, attaches to the sides of the Keptel LL-2400® fiber optic splice tray in order to provide a hinging capability to this tray.

The principles and features of the present invention will be more readily apparent and understood from the following detailed description, read in conjunction with the accompanying drawings.

BRIEF DESCRIPTION OF THE DRAWINGS

FIG. 1 is a perspective view of a hinge adapter according to a preferred embodiment of the invention;

FIG. 2(A) is an elevation view of the hinge adapter of FIG. 1;

FIG. 2(B) is a top plan view of the hinge adapter of FIG. 1;

FIG. 2(C) is an enlarged end view of the hinge adapter of FIG. 1; and

DETAILED DESCRIPTION

Figure 3:
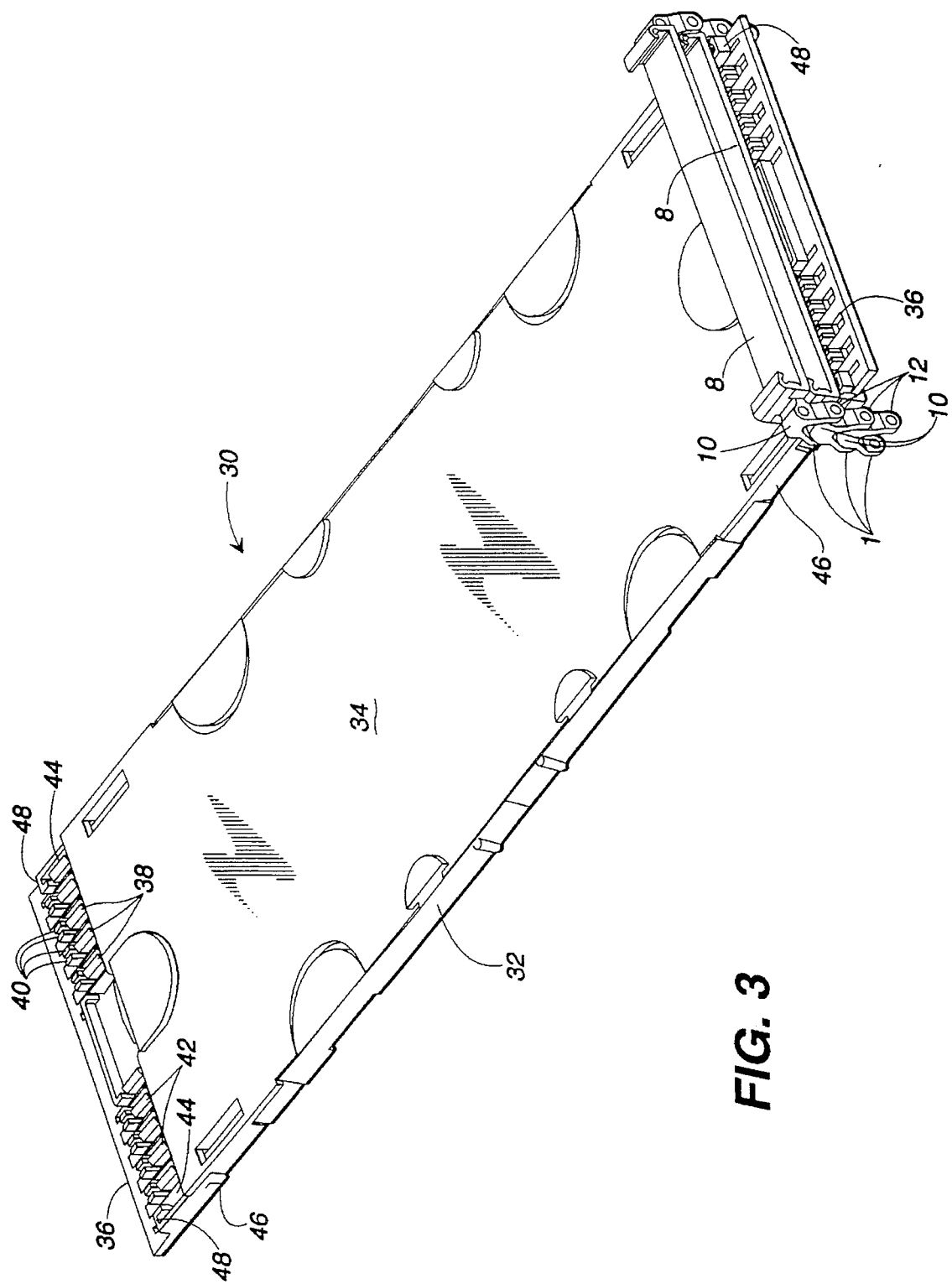
FIG. 3 is a perspective view of a fiber optic splice tray with a set of the interlocking hinge adapters of the invention.

With reference to FIGS. 1, 2(A), 2(B), and 2(C), a hinge adapter 1 according to a preferred embodiment of the invention has a U-shaped member 4 formed at each end, a C-shaped member 6 connected to each U-shaped member 4, and a band or web 8 interconnecting the two C-shaped members 6. Each U-shaped member 4 has a central portion 10 and a pair of arms 12 depending from either side of the central portion 10. Each arm 12 has a recessed portion or bore 14 formed in the distal end and the central portion 10 has a detent 16 formed at each end. Preferably, the recessed portion 14 is a circular aperture and the detent 16 has a spherical shape.

As best seen in FIG. 2(A), each C-shaped member 6 has an upstanding side wall 20 with a flange 22 extending outwardly from the side wall 20 in a direction generally parallel with the band 8. The outer edge of the flange 22 has a portion 24 which is thicker than the rest of the flange 22 and which protrudes down toward the band 8 of the hinge adapter 1. The side wall 20 is preferably formed at an angle of about 85° with respect to the band 8 and has a first groove 26 and a second groove 28 formed across the width thereof.

With reference to FIG. 3, a Keptel LL-2400® splice tray 30, which is a commercially available optical fiber splice tray, has a base member 32 and a lid 34 which snaps on top of the base member 32. Although the fiber optic splice tray 30 forms no part of the invention, the design and functioning of the splice tray 30 will be briefly described in order to ensure a complete understanding of the invention. A cable tie-down area 36 is located at each end of the base member 32 with each tie-down area 36 having a number of channels 38 for the passage of an equal number of optical fiber cables (not shown). Each channel 38 is defined between an adjacent pair of columns or posts 40 and between an adjacent pair of hold down elements 42. To mount an optical cable to the tray 30, the cable is pushed down between an adjacent pair of hold down elements 42 past the wedge-shaped tops of the elements 42. The elements 42 are resilient and move away from each other as the cable is being inserted and then return to the original positions once the cable has been inserted past the wedge-shaped tops. The wedge-shaped tops thereafter hold the cable firmly against the base member 32. The optical fibers are separated from the core tube within the splice tray 30 and the ends of the fibers are spliced to the ends of other optical fibers, such as fibers received from an opposite end of the splice tray 30. The fiber optic splice tray 30 typically contains inserts (not shown) mounted to the base member 32 for organizing and holding the splices.

An area 44 formed at each corner of the tray 30 within the tie-down area 36 does not receive any fiber optic cables and is not covered by the lid 34. Each of the four areas 44 on the fiber optic splice tray 30 is defined between a side wall 46 of the base member 32, an end wall 48, the column 40 closest to the side wall 46, and the hold down element 42 closest to the side wall 46.

As shown in FIG. 3, the hinge adapter 1 is attached to the side walls 46 of the fiber optic splice tray 30 at the areas 44. Although the figure shows only one hinge adapter 1 attached to an end of the splice tray 30, it should be understood that the hinge adapters 1 are preferably attached to both ends of the splice tray 30, thereby placing a U-shaped member 4 at each corner of the splice tray 30. To fasten the hinge adapter 1 to the splice tray 30, the portion 24 of the flange 22 is inserted into the area 44 and the hinge adapter 1 is rotated until the side wall 46 of the base member 32 is held between the side wall 20 of the hinge 1 and portion 24 of the flange 22 and also between the band 8 and the flange 22. When the hinge adapter 1 is attached to the base member 32, the first groove 26 of the C-shaped member 6 receives the top corner of the side wall 46 and the second groove 28 receives the bottom corner of the side wall 46. With both members 6 attached to the side walls 46, the hinge adapter 1 is securely mounted to the base member 32. To remove the hinge adapter 1 from the base member 32, the member 6 is rotated so that the portion 24 is removed from the area 44, thereby freeing the side wall 46 of the base member 32 from the member 6.

With reference to FIG. 3, the hinge adapters 1 are also attached to each other to form a stack of hinge adapters 1. The top two hinge adapters 1 are shown without an associated splice tray 30 in order to illustrate more clearly the interlocking relationship between the hinge adapters 1. It should be understood, however, that each splice tray 30 preferably has a hinge adapter 1 attached to both ends prior to being placed on top of another splice tray. When a splice tray is placed on top of the stack, the hinge adapters 1 at each end of the splice tray 30 interconnect with the hinge adapters 1 at each end of an existing splice tray 30 already in place. More specifically, the second hinge adapter 1 in the stack shown in FIG. 3 is attached to the bottom hinge adapter 1 by bending the arms 12 of the middle hinge adapter 1 away from each other and over the central portion 10 of the lower hinge adapter 1. The apertures 14 in the arms 12 receive the detents 16 in the central portion 10 and form a snap-lock arrangement securely fastening the two hinge adapters 1 to each other while leaving them free to pivot relative to each other. The top hinge adapter 1 in the stack is similarly attached to the middle hinge adapter 1 in a stack by placing its arms 12 over the central portion 10 of the middle hinge adapter 1.

When each splice tray 30 in a stack of splice trays has a hinge adapter 1 connected at both ends, any splice tray 30 in the stack can be more readily accessed. An installer or lineman accesses a certain splice tray 30 in the stack by removing the hinge adapters 1 on only one side of that splice tray 30 with the hinge adapters 1 above that splice tray 30. A hinge adapter 1 is separated from another hinge adapter 1 by moving the arms 12 of the one hinge adapter 1 out of engagement with the central portion 10 of the other hinge adapter 1. With the one side of the splice tray 30 unattached to the trays above it, the upper trays can be raised by pivoting them about an axis defined by the protrusions 16 in the hinge adapters 1 at the other side of the desired splice tray 30. Thus, any splice tray 30 in the stack can be accessed by simply disconnecting the hinge adapters 1 on one side of the tray 30 from the hinge adapters 1 above that tray 30 and then pivoting the upper trays away from the desired tray 30.

The hinge adapter 1 is comprised of a resilient material which is preferably a polycarbonate manufactured by General Electric under the name Lexan®. The hinge adapter 1 must be formed from a resilient material since the band 8 must be bent when fastening a second bracket 6 to the splice tray 30 after the first bracket 6 has already been fastened to the tray 30. The arms 12 must also be resilient since they must be moved outwardly away from each other in order to receive the central portion 10 of another hinge adapter 1. While the preferred material for the hinge adapter 1 is polycarbonate, the hinge adapter 1 may be formed from other materials which permit the band 8 and the arms 12 to deform and then return to their original positions.

The hinge adapter 1 is not limited to the dimensions shown nor to the use with just the Keptel LL-2400® splice tray 30. For instance, the U-shaped members 4 may be placed at a different distance away from the splice tray 30 or may be modified to have arms 12 of a different length. These modifications may be necessary to fit trays which have different thicknesses or trays which require a pivot axis further away from the side walls of the tray. Also, the arms 12 of the U-shaped members 4 may be formed to have recessed portions 14 at the end of the arms 12 closer to the central portion 10 and to have protrusions 16 at the opposite end of the arms 12. Further, the hinge adapter 1 may be used to provide a hinging capability to products other than just a splice tray. While the hinge adapter 1 has been described as having a band 8 interconnecting the brackets 6, the hinge adapter 1 could alternatively be formed in two separate pans without the band 8. The hinge adapter 1, being formed as a single structure or in two separate pans, may additionally have an adhesive strip for securing the hinge adapter 1 to the splice tray 30. For instance, an adhesive strip may be formed on the top surface of the band 8 to adhere the band 8 to a bottom of the splice tray 30.

The foregoing has been illustrative of the features and principles of the present invention. Various changes or modifications to the invention may be apparent to workers in the art without departure from the spirit and scope of the invention. For example, the adapter of the invention is readily adaptable for use with other elements than splice trays, and affords a convenient means of access to a particular one of a plurality of stacked elements.

In the claims:

1. An adapter for providing a hinging capability to an element comprising:

a U-shaped member having a central portion having first and second ends and a pair of arms depending from each end of said central portion with said arms having distal ends spaced apart from each other a distance approximately equal to a width of said central portion, wherein said central portion has a protrusion at each of said first and second ends and the distal end of each arm has a recessed portion; and means, connected to said U-shaped member, for attaching said U-shaped member to a side of the element;

wherein said recessed portions of said arms are for receiving protrusions on a central portion of a second adapter with said recessed portions of said arms and said protrusions on said second adapter defining an axis about which the element can pivot.

2. The adapter as set forth in claim 1, wherein said recessed portions comprise apertures in said arms.

3. The adapter as set forth in claim 1, wherein said U-shaped member and said attaching means are comprised of a polycarbonate material.

4. The adapter as set forth in claim 1, wherein said attaching means comprises a bracket for releasably receiving the side of the element.

5. The adapter as set forth in claim 4, wherein said element comprises a splice tray and said attaching means attaches to a tie-down area of the splice tray.

6. An adapter for providing a hinging capability to a fiber optic splice tray, comprising:

a first U-shaped member and a second U-shaped member spaced therefrom, each U-shaped member having a central portion having a pair of flexible arms depending from each end of said central portion with said arms having distal ends spaced apart a distance approximately equal to a width of said central portion, wherein said central portion has a protrusion at each of said ends and the distal end of each arm has a recessed portion;

first latching means, connected to said first U-shaped member, for attaching said first U-shaped member to a side of said fiber optic splice tray; and second latching means, connected to said second U-shaped member, for attaching said second U-shaped member to an opposite side of said fiber optic splice tray; and a flexible band for connecting said first latching means to said second latching means, said flexible band having a length approximately equal to a width of said fiber optic splice tray;

wherein said recessed portions of said arms on said first and second U-shaped members are for receiving protrusions on central portions of a second adapter and said arms on said first U-shaped member cooperate with said protrusions on one central portion of said second adapter to define a first axis about which said fiber optic splice tray can pivot.

7. The adapter as set forth in claim 6, wherein said arms on said second U-shaped member cooperate with said protrusions on a second central portion of said second adapter to define a second axis about which said fiber optic splice tray can pivot.

8. The adapter as set forth in claim 6, wherein said recessed portions comprise apertures in said arms.

9. The adapter as set forth in claim 6, wherein said first and second U-shaped members, said first and second latching means, and said flexible band are comprised of a polycarbonate material.

10. The adapter as set forth in claim 6, wherein said first and second latching means comprise brackets for releasably receiving said one side and said opposite side of said fiber optic splice tray, respectively.

11. The adapter as set forth in claim 6, wherein said first and second latching means are connected to a cable tie-down area of said fiber optic splice tray.

12. A hinge adapter for pivotally stacking a pair of substantially flat elements, said adapter comprising:

a first substantially U-shaped member adapted to be mounted to a first one of the pair of elements;

a second substantially U-shaped member adapted to be mounted to a second one of the pair of elements;

each of said U-shaped members comprising a central portion and first and second arms depending from said central portion and spaced apart a distance substantially equal to a width of said central portion; and means for pivotally mounting said second U-shaped member to said first U-shaped member comprising a detent member at each end of said central portion of each of said U-shaped members, and an opening in the distal end of each of said depending arms adapted to receive and pivotally hold said detent members on said first substantially U-shaped member.

13. A hinge adapter as claimed in claim 12 and further comprising third and fourth substantially U-shaped members, and means for joining said first and third U-shaped members in spaced relationship to each other and for joining said second and fourth U-shaped members in spaced relationship to each other.

14. The adapter as set forth in claim 1, wherein said attaching means is for releasably attaching said U-shaped member to the side of the element.

15. The adapter as set forth in claim 6, wherein said first means is for releasably attaching said first U-shaped member to the side of the fiber optic splice tray and said second means is for releasably attaching said second U-shaped member to the opposite side of the fiber optic splice tray.

16. The adapter as set forth in claim 6, wherein each of said first and second latching means comprises a wall for contacting the respective side of the fiber optic splice tray and a flange formed at an upper end of the wall and having an enlarged end portion, the flange being placed over the respective side of the fiber optic splice tray and being sized such that a spacing between the enlarged end portion and the wall is approximately equal to a width of the respective side of the fiber optic splice tray, whereby said respective side of the fiber optic splice tray can be firmly held between said enlarged portion and said wall.

17. The hinge adapter as set forth in claim 16, wherein said wall is formed at an angle of approximately 85 degrees with respect to said flexible band.

18. The hinge adapter as set forth in claim 12, further comprising first means for releasably mounting said first U-shaped member to the first one of the pair of elements and second means for releasably mounting said second U-shaped member to the second one of the pair of elements.

* * * * *